United States Patent
Hiruma

(10) Patent No.: US 11,949,326 B2
(45) Date of Patent: Apr. 2, 2024

(54) POWER SUPPLY DEVICE, POWER SUPPLY METHOD, AND NON-TRANSITORY COMPUTER-READABLE MEDIUM

(71) Applicant: MITSUBA Corporation, Gunma (JP)

(72) Inventor: Hiroaki Hiruma, Gunma (JP)

(73) Assignee: MITSUBA Corporation, Gunma (JP)

( * ) Notice: Subject to any disclaimer, the term of this patent is extended or adjusted under 35 U.S.C. 154(b) by 262 days.

(21) Appl. No.: 17/630,167

(22) PCT Filed: Jul. 2, 2020

(86) PCT No.: PCT/JP2020/025988
§ 371 (c)(1),
(2) Date: Jan. 26, 2022

(87) PCT Pub. No.: WO2021/020018
PCT Pub. Date: Feb. 4, 2021

(65) Prior Publication Data
US 2022/0368217 A1    Nov. 17, 2022

(30) Foreign Application Priority Data
Jul. 31, 2019   (JP) ................................ 2019-141083

(51) Int. Cl.
*H02M 1/36* (2007.01)
*H01M 10/44* (2006.01)
(Continued)

(52) U.S. Cl.
CPC ........... *H02M 1/36* (2013.01); *H01M 10/446* (2013.01); *H02J 7/0031* (2013.01); *H02J 7/345* (2013.01)

(58) Field of Classification Search
CPC ............. H01M 10/4264; H01M 10/44; H01M 10/446; H01M 10/48; H02J 7/00304;
(Continued)

(56) References Cited

U.S. PATENT DOCUMENTS

| 7,489,048 B2 * | 2/2009 | King ....................... B60L 58/21 |
| | | 307/10.1 |
| 2007/0159007 A1 | 7/2007 | King et al. |
| 2019/0241088 A1 * | 8/2019 | Kimura ................... B60L 53/22 |

FOREIGN PATENT DOCUMENTS

| JP | 2001065437 | 3/2001 |
| JP | 2005312160 | 11/2005 |

(Continued)

OTHER PUBLICATIONS

"Office Action of India Counterpart Application", dated Apr. 13, 2022, p. 1-p. 6.
(Continued)

*Primary Examiner* — Jared Fureman
*Assistant Examiner* — Nicolas Bellido
(74) *Attorney, Agent, or Firm* — JCIPRNET

(57) ABSTRACT

Provided is a power supply device including a capacitor, a pre-charge circuit and a control circuit. The capacitor is connected in series with a contactor that is connected between an inverter driving a motor and a battery and that switches on or off power supply from the battery to the inverter, and is connected in parallel with the inverter. The pre-charge circuit is connected in parallel with the contactor and pre-charges the capacitor. The control circuit controls the pre-charge circuit and the contactor. The control circuit includes a sensor that measures the voltage of the battery and the voltage of the capacitor, and determines whether the pre-charge is necessary according to whether a ratio of the voltage of the capacitor to the voltage of the battery is equal to or less than a target value.

7 Claims, 2 Drawing Sheets

(51) Int. Cl.
*H02J 7/00* (2006.01)
*H02J 7/34* (2006.01)

(58) Field of Classification Search
CPC ...... H02J 7/0031; H02J 7/0047; H02J 7/0063; H02J 7/007182; H02J 7/34; H02J 7/345; H02M 1/32; H02M 1/36; H02M 7/125; H02M 7/521; Y02T 10/70
USPC .................................................. 320/166, 167
See application file for complete search history.

(56) References Cited

FOREIGN PATENT DOCUMENTS

| | | | |
|---|---|---|---|
| JP | 2005312160 A | * | 11/2005 |
| JP | 2006262586 | | 9/2006 |
| JP | 2007244124 A | * | 9/2007 |
| JP | 2005295697 | | 10/2010 |
| JP | 4635664 B2 | * | 2/2011 |
| JP | 2012222955 | | 11/2012 |
| JP | 2013205257 | | 10/2013 |

OTHER PUBLICATIONS

Search Report of Europe Counterpart Application, dated Aug. 8, 2022, p. 1-p. 7.
"Office Action of Europe Counterpart Application", dated Aug. 18, 2023, p. 1-p. 6.
"International Search Report (Form PCT/ISA/210) of PCT/JP2020/025988", dated Sep. 8, 2020, with English translation thereof, pp. 1-4.
"Written Opinion of the International Searching Authority (Form PCT/ISA/237) of PCT/JP2020/025988," dated Sep. 8, 2020, with English translation thereof, pp. 1-7.

* cited by examiner

POWER SUPPLY DEVICE, POWER SUPPLY METHOD, AND NON-TRANSITORY COMPUTER-READABLE MEDIUM

CROSS-REFERENCE TO RELATED APPLICATION

This application is a 371 application of the International PCT application serial no. PCT/JP2020/025988, filed on Jul. 2, 2020, which claims the priority benefit of Japan Patent Application No. 2019-141083, filed on Jul. 31, 2019. The entirety of each of the above-mentioned patent applications is hereby incorporated by reference herein and made a part of this specification.

TECHNICAL FIELD

The present invention relates to a power supply device, a power supply method, and a power supply program.

RELATED ART

In an intermediate to large capacity motor driver (inverter), a built-in capacitor for ripple absorption also requires a large capacity.

Hence, since a current rating of a wiring or a relay (contactor) is exceeded due to an inrush current from a battery to this capacitor at power-on, it is necessary to perform a preliminary charge (pre-charge) in advance via a resistor or the like (see, for example, Patent Documents 1 and 2).

Here, since motor driving cannot be performed during the pre-charge, the pre-charge needs to be completed quickly in order to improve marketability.

PRIOR-ART DOCUMENTS

Patent Documents

Patent Document 1: Japanese Patent Laid-open No. 2001-065437
Patent Document 2: Japanese Patent Laid-open No. 2005-295697

SUMMARY OF THE INVENTION

Problems to be Solved by the Invention

However, in order to quickly perform a pre-charge, a resistance value of the above resistor is reduced, and a resistor having a large volume (large inrush current capacity) that can withstand a temperature rise caused by instantaneous loss increased thereby is required. In general, a winding type cement resistor or the like is often used as the resistor. Further, considering the possibility that a maximum load may continue on the resistor due to a failure of an inverter circuit or a short circuit of the circuit, in order to deal with the above, a relatively large and expensive resistor may be required.

Here, the above resistor is mostly of a type equipped with a lead wire, and has a large size and poor layout properties in an inverter housing. Also, the above resistor is more expensive than a chip resistor. Since a flow process is required to mount the resistor on a printed circuit board, there is a problem that the cost increases due to an increase of processes.

The present invention has been made in consideration of the above circumstances, and a main purpose thereof is to provide a power supply device, a power supply method, and a power supply program in which an increase in the cost can be suppressed.

Means for Solving the Problems

In order to solve the above problems, one aspect of the present invention is a power supply device including: a capacitor, connected in series with a contactor that is connected between an inverter driving a motor and a battery and that switches on or off power supply from the battery to the inverter, and connected in parallel with the inverter; a pre-charge circuit pre-charging the capacitor, connected in parallel with the contactor and configured to include a pre-charge resistor that supplies a pre-charge current to the capacitor; and a control circuit, controlling the pre-charge circuit and the contactor. The power supply device is characterized as follows. The control circuit includes a sensor that measures a voltage of the battery and a voltage of the capacitor, and, after determining whether the voltage of the capacitor is less than a voltage value obtained by adding a predetermined voltage value to the voltage of the battery, determines whether the pre-charge is necessary according to whether a ratio of the voltage of the capacitor to the voltage of the battery is equal to or less than a target value.

One aspect of the present invention is characterized as follows. In the above power supply device, the control circuit includes a storage part and a counter, and, if determining that the pre-charge is necessary, controls the storage part to store the voltage of the capacitor as a capacitor voltage initial value and store the voltage of the battery as a battery voltage initial value, and controls the counter to measure a predetermined time during which a maximum load continues on the pre-charge resistor and a pre-charge period during which the pre-charge current is supplied to the capacitor after start of the pre-charge. Whether the pre-charge is normally performed is determined according to whether the voltage of the capacitor at a moment when the predetermined time has elapsed after the start of the pre-charge period is equal to or greater than a threshold obtained by multiplying a predicated value of the voltage of the capacitor by a tolerance, the predicated value being expressed by (the battery voltage initial value−the capacitor voltage initial value)×natural logarithm (−the predetermined time/capacitance value of the capacitor×resistance value of the pre-charge resistor)+the battery voltage initial value.

One aspect of the present invention is characterized as follows. In the above power supply device, the control circuit determines whether the pre-charge is completed according to whether the ratio of the voltage of the capacitor to the voltage of the battery is equal to or greater than the target value, and, if the ratio is less than the target value, determines whether the pre-charge period has elapsed.

One aspect of the present invention is characterized as follows. In the above power supply device, in a case where the pre-charge is stopped in the determination of whether the pre-charge is completed, and in a case where the pre-charge is not executed in the determination of whether the pre-charge is necessary, the control circuit switches on the contactor and executes the power supply from the battery to the inverter.

One aspect of the present invention is characterized as follows. In the above power supply device, the predetermined time is determined in advance based on the resistance value of the pre-charge resistor and a power rating.

One aspect of the present invention is a power supply method in a power supply device including a capacitor, connected in series with a contactor that is connected between an inverter driving a motor and a battery and that switches on or off power supply from the battery to the inverter, and connected in parallel with the inverter; a pre-charge circuit pre-charging the capacitor, connected in parallel with the contactor and configured to include a pre-charge resistor that supplies a pre-charge current to the capacitor; and a control circuit, controlling the pre-charge circuit and the contactor. The power supply method is characterized as follows. The control circuit includes a sensor that measures a voltage of the battery and a voltage of the capacitor, and, after determining whether the voltage of the capacitor is less than a voltage value obtained by adding a predetermined voltage value to the voltage of the battery, determines whether the pre-charge is necessary according to whether a ratio of the voltage of the capacitor to the voltage of the battery is equal to or less than a target value.

One aspect of the present invention is a power supply program executed in a power supply device including a capacitor, connected in series with a contactor that is connected between an inverter driving a motor and a battery and that switches on or off power supply from the battery to the inverter, and connected in parallel with the inverter; a pre-charge circuit pre-charging the capacitor, connected in parallel with the contactor and configured to include a pre-charge resistor that supplies a pre-charge current to the capacitor; and a control circuit, controlling the pre-charge circuit and the contactor, in which the power supply program is executed by the control circuit. The power supply program is characterized as follows. The control circuit includes a sensor that measures a voltage of the battery and a voltage of the capacitor, and, after determining whether the voltage of the capacitor is less than a voltage value obtained by adding a predetermined voltage value to the voltage of the battery, determines whether the pre-charge is necessary according to whether a ratio of the voltage of the capacitor to the voltage of the battery is equal to or less than a target value.

Effects of the Invention

According to the present invention, a power supply device, a power supply method, and a power supply program can be provided in which an increase in the cost can be suppressed.

DESCRIPTION OF THE EMBODIMENTS

Figure 1:
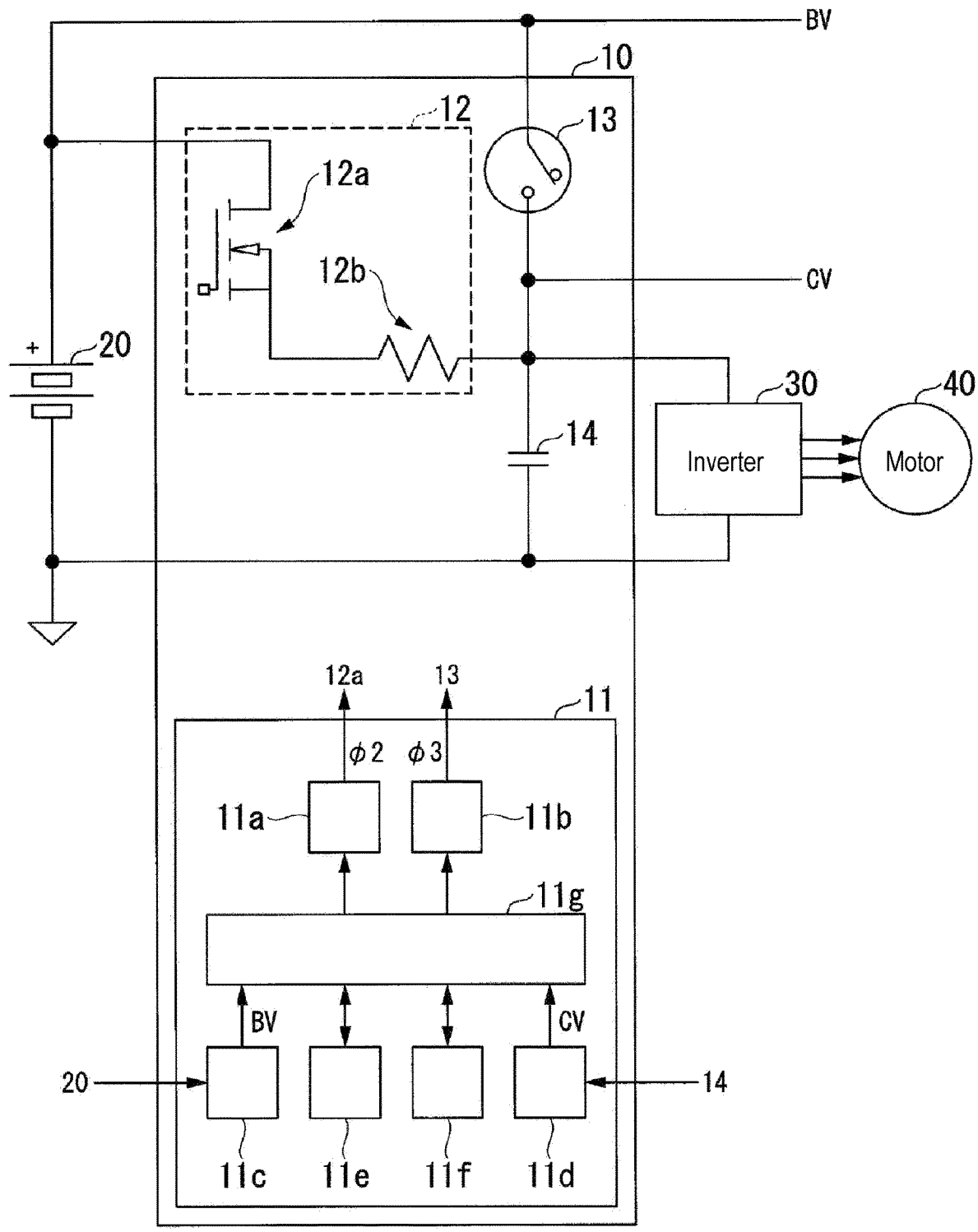
FIG. 1 illustrates an example of a schematic configuration of a power supply device 10 in the present embodiment.

Hereinafter, aspects of the present invention will be described through embodiments of the invention. However, the following embodiments do not limit the invention according to the claims. Not all combinations of features described in the embodiments are necessarily essential to the solutions of the invention. In the drawings, the same or similar portions may be assigned the same reference numerals and duplicate description may be omitted.

In the power supply device 10 of the present embodiment, by setting a time during which a maximum load continues on a resistor (pre-charge resistor 12b) to a very short time (hereinafter referred to as "predetermined time", details of which will be described later) and performing a self-diagnosis within that short time, a failure due to self-heating of the resistor is prevented. A method of self-diagnosis is as follows. After a charge for a very short time while a voltage of a battery (battery 20) and a voltage of a capacitor (capacitor 14) are respectively monitored, if the voltage is within an expected voltage range, it is determined to be normal and the charge is continued; if the voltage is out of the range, it is determined to be abnormal, further charging is suspended, and overheating and failure of the resistor are prevented.

As shown in an expression to be described later, a predicted voltage is corrected by a voltage initial value before charging, which always leads to a qualified failure determination. Hence, since electrical charges of the capacitor do not have to be discharged before charging, initial processing can be shortened.

Hereinafter, the power supply device 10 in the present embodiment is described with reference to the drawings.

FIG. 1 illustrates an example of a schematic configuration of the power supply device 10 in the present embodiment.

As shown in FIG. 1, the power supply device 10 is configured to include a control circuit 11, a pre-charge circuit 12, a contactor 13, and a capacitor 14.

The contactor 13 (relay) is connected between an inverter 30 driving a motor 40 and a battery 20, and switches on or off the power supply from the battery 20 to the inverter 30.

The capacitor 14 is connected in series with the contactor 13 and is connected in parallel with the inverter 30.

The pre-charge circuit 12 is connected in parallel with the contactor 13, and includes a pre-charge resistor 12b that supplies a pre-charge current to the capacitor 14, and a pre-charge switch 12a that is connected in series to the pre-charge resistor 12b. The pre-charge circuit 12 pre-charges the capacitor 14.

The control circuit 11 controls the pre-charge circuit 12 and the contactor 13.

The control circuit 11 includes a pre-charge control circuit 11a, a contactor control circuit 11b, a sensor 11c, a sensor 11d, a counter 11e, a storage part 11f, and a control part 11g.

When an instruction signal is input from the control part 11g, the pre-charge control circuit 11a outputs a driving signal $\phi 2$ for switching on and off the pre-charge switch 12a.

Although the pre-charge switch 12a is composed of an NMOS FET in FIG. 1, the pre-charge switch 12a may be composed of a PMOS FET or may not be a switch formed of a semiconductor. That is, the pre-charge switch 12a is switched on by the driving signal $\phi 2$, connects the battery 20 and the pre-charge resistor 12b, and allows a current (pre-charge current) supplied from the battery 20 that corresponds to a voltage BV of the battery 20 to flow through the pre-charge resistor 12b.

When an instruction signal is input from the control part 11g, the contactor control circuit 11b outputs a driving signal $\phi 3$ for switching on and off the contactor 13.

However, during a pre-charge period, the contactor 13 is not switched on by the driving signal $\phi 3$ and does not connect the battery 20 and the inverter 30, and the inverter 30 is not supplied with the power corresponding to the voltage BV. The reason is that, when the contactor 13 is switched on without pre-charging the capacitor 14, a contact of the contactor 13 is welded by an excessive current that charges the capacitor 14.

That is, the contactor control circuit 11b switches on the contactor 13 after pre-charging the capacitor 14 by the pre-charge control circuit 11a.

The sensor 11c measures the voltage BV of the battery 20, and transmits the measured voltage BV to the control part 11g.

The sensor 11d measures a voltage CV of the capacitor 14, and transmits the measured voltage CV to the control part 11g.

The counter 11e is controlled by the control part 11g, and measures a time ("predetermined time dt") during which a maximum load continues on a resistor (pre-charge resistor 12b) and a time ("pre-charge period pt") during which the pre-charge current is supplied to the capacitor 14 after start of a pre-charge. For example, in the present embodiment, the predetermined time dt is measured as count number N1×periodic processing time T1. The pre-charge period pt is measured as count number N2×periodic processing time T2. At this time, the count number N1 at the moment when the predetermined time dt is measured is less than (<) the count number N2 at the moment when the pre-charge period pt is measured. The periodic processing time T1 and the periodic processing time T2 may be set to be the same or different.

The control part 11g determines whether a pre-charge is necessary, and if it is determined that the pre-charge is necessary, the storage part 11f stores the voltage CV of the capacitor 14 as a capacitor voltage initial value FCV and stores the voltage BV of the battery 20 as a battery voltage initial value FBV.

The control part 11g determines whether the pre-charge is normally performed according to whether the voltage CV of the capacitor 14 at the moment when the pre-charge is temporarily stopped is equal to or greater than a threshold TH (predicted value PCV×tolerance TO) corresponding to a predicted value PCV of the voltage of the capacitor 14, in which the predicted value PCV is expressed by the battery voltage initial value FBV, the capacitor voltage initial value FCV, a capacitance value C of the capacitor 14, a resistance value R of the pre-charge resistor 12b, a natural logarithm e, and the predetermined time dt. Here, the predicted value PCV is expressed as in the following expression (1).

Predicted value $PCV$=(battery voltage initial value $FBV$−capacitor voltage initial value $FCV$)×natural logarithm $e$(−predetermined time $dt$/capacitance value $C$×resistance value $R$)+battery voltage initial value $FBV$     (1)

The predetermined time dt is determined in advance based on the resistance value R of the pre-charge resistor 12b and a power rating W.

For example, according to a graph (in which the horizontal axis indicates "time t" and the vertical axis indicates "power W") showing one-pulse limiting power of a resistor, in the pre-charge resistor 12b having the resistance value R, the resistance value R is reduced and the "predetermined time" being the time during which the maximum load continues is shortened, and a failure due to self-heating can be prevented even if power larger than the power rating W flows through.

Hence, the pre-charge circuit 12 can be realized using, as the pre-charge resistor 12b, an inexpensive resistor having a small capacity, such as a chip resistor.

Figure 2:
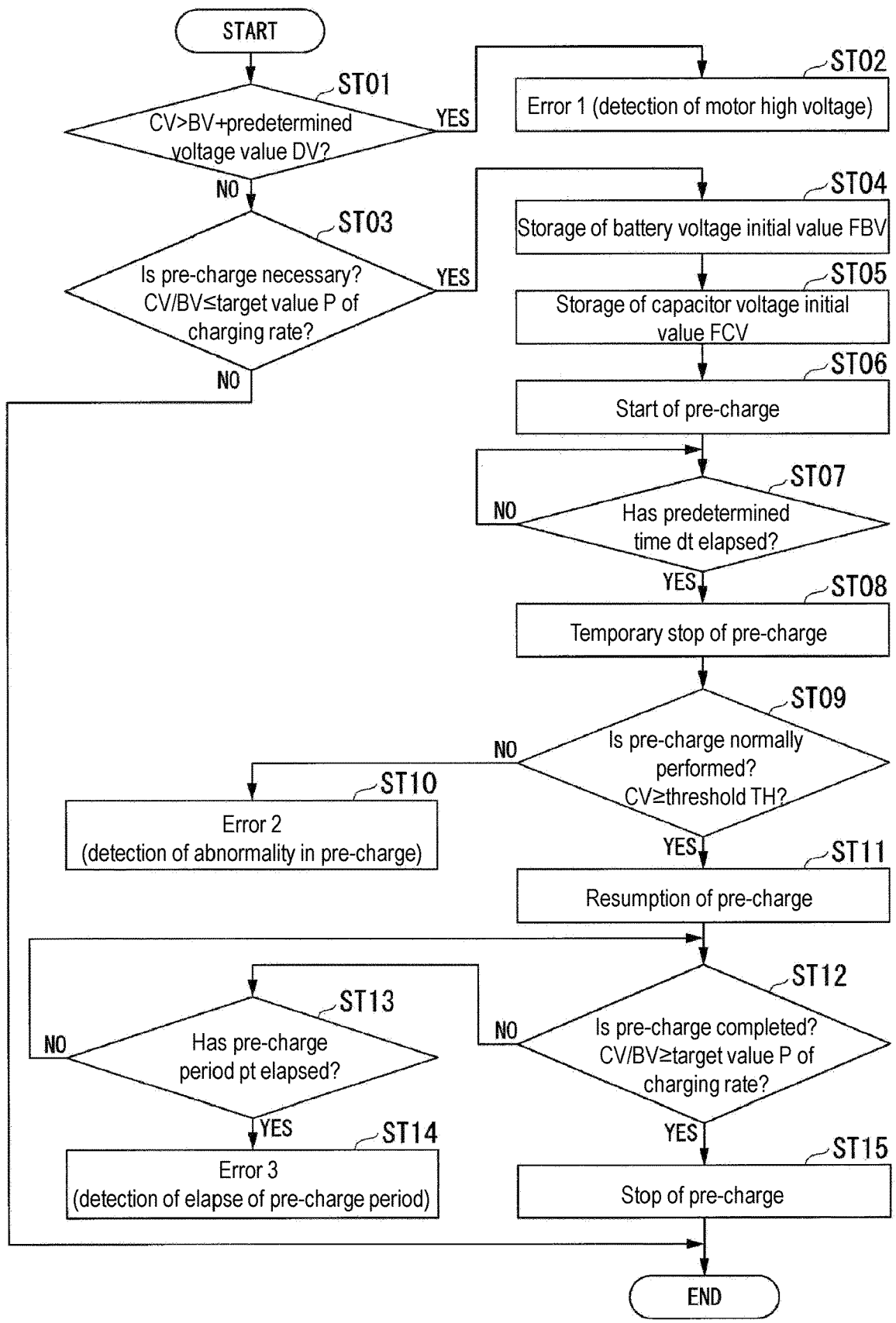
FIG. 2 is a flowchart illustrating processing performed by a control circuit 11 during a pre-charge period of the power supply device 10 in the present embodiment.

Subsequently, control processing performed by the control circuit 11 during the pre-charge period is described with reference to FIG. 2. FIG. 2 is a flowchart illustrating processing performed by the control circuit 11 during the pre-charge period of the power supply device 10 in the present embodiment.

It is determined whether the voltage CV of the capacitor 14 is greater than (>) the voltage BV of the battery 20 plus (+) a predetermined voltage value DV (step ST01). Specifically, the control part 11g in the control circuit 11, before determining whether a pre-charge is necessary (step ST03), determines whether the voltage CV of the capacitor 14 is greater than a voltage value obtained by adding the predetermined voltage value DV (for example, the voltage BV of the battery 20×0.05) to the voltage BV of the battery 20. The predetermined voltage value DV to be added to the voltage BV of the battery 20 may be a voltage having a value obtained by multiplying the voltage BV of the battery 20 by 0.03 to 0.1.

If the voltage CV of the capacitor 14 is equal to or less than the voltage value obtained by adding the predetermined voltage value DV to the voltage BV of the battery 20 (NO in step ST01), the control part 11g proceeds to step ST03. On the other hand, if the voltage CV of the capacitor 14 is greater than the voltage value obtained by adding the predetermined voltage value DV to the voltage BV of the battery 20 (YES in step ST01), the process proceeds to step ST02.

Error 1: A motor high voltage is detected and it is determined not to proceed with a pre-charge operation (step ST02).

Specifically, the control part 11g in the control circuit 11 determines not to proceed with the pre-charge operation. The reason is that an induced voltage of the inverter 30 is higher than a power supply voltage supplied to the inverter 30, and there is a possibility that the motor 40 may be over-rotated. The following events may be considered as events that may occur if nothing has been detected.

There is a high possibility that the inverter 30 may perform sudden braking due to the contactor 13.

There is a risk that an inrush current may flow from the capacitor 14 to the battery 20, leading to welding of the contactor 13.

It is determined whether a pre-charge is necessary (step ST03). Specifically, the control part 11g in the control circuit 11 determines whether the pre-charge is necessary according to whether a charging rate (ratio=voltage CV of capacitor 14/voltage BV of battery 20) of the capacitor 14 with respect to the battery 20 is equal to or less than a target value P.

If the charging rate of the capacitor 14 with respect to the battery 20 is greater than the target value P (set to 0.9 here) (NO in step ST03), no pre-charge is executed.

In this case, the control part 11g in the control circuit 11 outputs an instruction signal to the contactor control circuit 11b, and the contactor control circuit 11b outputs the driving signal ϕ3 for switching on the contactor 13. Accordingly, the control part 11g switches on the contactor 13 and executes the power supply from the battery 20 to the inverter 30.

On the other hand, if the charging rate of the capacitor 14 with respect to the battery 20 is equal to or less than the target value P (set to 0.9 here) (YES in step ST03), the process proceeds to step ST04.

Storage of the battery voltage initial value FBV is executed (step ST04).

Specifically, the sensor 11c measures the voltage BV of the battery 20, and transmits the measured voltage BV to the control part 11g. The control part 11g determines whether the pre-charge is necessary, and since it is determined that the pre-charge is necessary, the storage part 11f stores the transmitted voltage BV of the battery 20 as the battery voltage initial value FBV.

Storage of the capacitor voltage initial value FCV is executed (step ST05).

Specifically, the sensor 11*d* measures the voltage CV of the capacitor 14, and transmits the measured voltage CV of the capacitor 14 to the control part 11*g*. The control part 11*g* determines whether the pre-charge is necessary, and since it is determined that the pre-charge is necessary, the storage part 11*f* stores the transmitted voltage CV of the capacitor 14 as the capacitor voltage initial value FCV.

The pre-charge is started (step ST06).

Specifically, the control part 11*g* in the control circuit 11 outputs an instruction signal to the pre-charge control circuit 11*a*, and the pre-charge control circuit 11*a* outputs the driving signal φ2 for switching on and off the pre-charge switch 12*a*. Accordingly, the control part 11*g* switches on the pre-charge switch 12*a* and starts the pre-charge that supplies the pre-charge current to the capacitor 14.

The control part 11*g* controls the counter 11*e* to start measurement of the time ("pre-charge period pt") during which the pre-charge current is supplied to the capacitor 14 after start of the pre-charge. Specifically, the pre-charge period pt is measured as count number N2×periodic processing time T2.

After the start of the pre-charge, it is repeatedly determined whether the predetermined time dt has elapsed (step ST07). Specifically, the control part 11*g* controls the counter 11*e* to measure the time ("predetermined time dt") during which the maximum load continues on a resistor (pre-charge resistor 12*b*) after the start of the pre-charge as count number N1×periodic processing time T1. Here, for example, the predetermined time is measured according to the following: count number N1×periodic processing time T1=10×0.001 [s]=10 ms.

Of course, the predetermined time dt depends on the magnitude of the resistance value R. If less than the resistance value corresponding to 10 ms, the predetermined time dt is 1 ms to 9 ms; if greater than the resistance value corresponding to 10 ms, the predetermined time dt is 11 ms or more.

If the time measured by the counter 11*e* has passed the "predetermined time dt" (YES in step ST07), the process proceeds to step ST08.

The pre-charge is temporarily stopped (step ST08).

Specifically, the control part 11*g* controls the counter 11*e* to start measurement of the time ("pre-charge period pt") during which the pre-charge current is supplied to the capacitor 14, and, after the predetermined time dt has elapsed after the start of measurement of the pre-charge period pt, switches off the pre-charge switch 12*a* and temporarily stops the pre-charge.

It is determined whether the pre-charge is normal (step ST09).

Specifically, the control part 11*g* determines whether the pre-charge is normally performed according to whether the voltage CV of the capacitor 14 at the moment when the pre-charge is temporarily stopped is equal to or greater than the threshold TH (predicted value PCV of voltage of capacitor 14×tolerance TO) corresponding to the predicted value PCV (voltage calculated by the above expression (1)) of the voltage of the capacitor 14 described above. Here, for example, the determination is made by setting the tolerance TO as 0.5. However, this value may be a value around 0.5.

In the determination of whether the pre-charge is normally performed, if it is determined that the pre-charge is not normally performed, the process proceeds to step ST10.

Error 2: An abnormality in the pre-charge is detected and the pre-charge is stopped (step ST10).

Specifically, the control part 11*g* in the control circuit 11 outputs an instruction signal to the pre-charge control circuit 11*a*, and the pre-charge control circuit 11*a* outputs the driving signal φ2 for switching on and off the pre-charge switch 12*a*. Accordingly, the control part 11*g* switches off the pre-charge switch 12*a* and stops the pre-charge that supplies the pre-charge current to the capacitor 14.

An assumed cause of this case may be considered to be an abnormality in the pre-charge resistor 12*b* and an abnormality in the inverter 30. The following events may be considered as events that may occur if nothing has been detected. Due to a failure of the pre-charge resistor 12*b*, the capacitor 14 cannot be pre-charged and the motor 40 does not operate.

In the determination of whether the pre-charge is normally performed, if it is determined that the pre-charge is normally performed, the process proceeds to step ST11.

The pre-charge is resumed (step ST11).

Specifically, the control part 11*g* in the control circuit 11 outputs an instruction signal to the pre-charge control circuit 11*a*, and the pre-charge control circuit 11*a* outputs the driving signal φ2 for switching on and off the pre-charge switch 12*a*. Accordingly, the control part 11*g* switches on the pre-charge switch 12*a* and resumes the pre-charge that supplies the pre-charge current to the capacitor 14.

It is determined whether the pre-charge is completed (step ST12).

Specifically, the control part 11*g* in the control circuit 11, after resuming the pre-charge, determines whether the pre-charge is completed according to whether the charging rate (ratio=voltage CV of capacitor 14/voltage BV of battery 20) of the capacitor 14 with respect to the battery 20 is equal to or greater than the target value P.

If the charging rate of the capacitor 14 with respect to the battery 20 is less than the target value P (set to 0.9 here) (NO in step ST12), the process proceeds to step ST13.

It is determined whether the pre-charge period pt has elapsed (step ST13).

Specifically, the control part 11*g* controls the counter 11*e* to measure the time ("pre-charge period pt") during which the pre-charge current is supplied to the capacitor 14 after start of the pre-charge as count number N2×periodic processing time T2. Here, for example, the predetermined time is measured according to the following: count number N2×periodic processing time T2=600×0.001 [s]=0.6 s. The control part 11*g* determines whether a preset pre-charge period for the pre-charge has elapsed according to a measurement time of the counter 11*e*.

If the pre-charge period pt has elapsed (YES in step ST13), the process proceeds to step ST14.

Error 3: An elapse of the pre-charge period is detected, the pre-charge switch is switched off, and the pre-charge is stopped (step ST14).

Specifically, the control part 11*g* in the control circuit 11 outputs an instruction signal to the pre-charge control circuit 11*a*, and the pre-charge control circuit 11*a* outputs the driving signal φ2 for switching on and off the pre-charge switch 12*a*. Accordingly, the control part 11*g* switches off the pre-charge switch 12*a* and stops the pre-charge that supplies the pre-charge current to the capacitor 14.

An assumed cause of this case may be considered to be an abnormality in the pre-charge resistor 12*b* and an abnormality in the inverter 30. The following events may be considered as events that may occur if nothing has been detected. Due to a failure of the pre-charge resistor 12*b*, the capacitor 14 cannot be pre-charged and the motor 40 does not operate.

If the pre-charge period pt has not elapsed (NO in step ST13), the process proceeds to step ST12 above.

On the other hand, if the charging rate of the capacitor 14 with respect to the battery 20 is equal to or greater than the target value P (set to 0.9 here) (YES in step ST12), the process proceeds to step ST15.

The pre-charge is stopped (step ST15).

Specifically, the control part 11g in the control circuit 11 outputs an instruction signal to the pre-charge control circuit 11a, and the pre-charge control circuit 11a outputs the driving signal φ2 for switching on and off the pre-charge switch 12a. Accordingly, the control part 11g switches off the pre-charge switch 12a and stops the pre-charge that supplies the pre-charge current to the capacitor 14. That is, the pre-charge period ends.

In this case, the control part 11g in the control circuit 11 outputs an instruction signal to the contactor control circuit 11b, and the contactor control circuit 11b outputs the driving signal φ3 for switching on the contactor 13. Accordingly, the control part 11g switches on the contactor 13 and executes the power supply from the battery 20 to the inverter 30.

According to the present invention, since a heat resistance margin of a resistor can be suppressed low, by realizing a pre-charge circuit using an inexpensive resistor having a small capacity, such as a chip resistor, an inverter can be reduced in size and cost. If the pre-charge circuit can be realized by the chip resistor, there is a possibility that a flow process can be skipped, and a large cost merit is obtained. In addition, processes for crimping a lead wire and connecting a connector are not required, and a resistor assembly process can be replaced from manual work to high-speed mounting by a chip mounter.

Accordingly, a power supply device, a power supply method, and a power supply program can be provided in which an increase in the cost can be suppressed.

Although the embodiments of the invention have been described in detail with reference to the drawings, the specific configuration is not limited to the present embodiment, and designs and the like within the scope not deviating from the gist of the invention are also included.

What is claimed is:

1. A power supply device, comprising:
    a capacitor, connected in series with a contactor that is connected between an inverter driving a motor and a battery and that switches on or off power supply from the battery to the inverter, and connected in parallel with the inverter;
    a pre-charge circuit pre-charging the capacitor, connected in parallel with the contactor and configured to comprise a pre-charge resistor that supplies a pre-charge current to the capacitor; and
    a control circuit, controlling the pre-charge circuit and the contactor, wherein
    the control circuit comprises a sensor that measures a voltage of the battery and a voltage of the capacitor, and, after determining whether the voltage of the capacitor is less than a voltage value obtained by adding a predetermined voltage value to the voltage of the battery, determines whether the pre-charge is necessary according to whether a ratio of the voltage of the capacitor to the voltage of the battery is equal to or less than a target value.

2. The power supply device according to claim 1, wherein the control circuit comprises a storage part and a counter, and, if determining that the pre-charge is necessary, controls the storage part to store the voltage of the capacitor as a capacitor voltage initial value and store the voltage of the battery as a battery voltage initial value, and controls the counter to measure a predetermined time during which a maximum load continues on the pre-charge resistor and a pre-charge period during which the pre-charge current is supplied to the capacitor after start of the pre-charge;
    whether the voltage of the capacitor at a moment when the predetermined time has elapsed after the start of the pre-charge period is equal to or greater than a threshold obtained by multiplying a predicated value of the voltage of the capacitor by a tolerance, the predicated value being expressed by (the battery voltage initial value—the capacitor voltage initial value)×natural logarithm (—the predetermined time / capacitance value of the capacitor×resistance value of the pre-charge resistor)+the battery voltage initial value.

3. The power supply device according to claim 2, wherein the control circuit determines whether the pre-charge is completed according to whether the ratio of the voltage of the capacitor to the voltage of the battery is equal to or greater than the target value, and, if the ratio is less than the target value, determines whether the pre-charge period has elapsed.

4. The power supply device according to claim 3, wherein
    in a case where the pre-charge is stopped in the determination of whether the pre-charge is completed, and
    in a case where the pre-charge is not executed in the determination of whether the pre-charge is necessary,
    the control circuit switches on the contactor and executes the power supply from the battery to the inverter.

5. The power supply device according to claim 2, wherein the predetermined time is determined in advance based on the resistance value of the pre-charge resistor and a power rating.

6. A power supply method in a power supply device, the power supply device comprising:
    a capacitor, connected in series with a contactor that is connected between an inverter driving a motor and a battery and that switches on or off power supply from the battery to the inverter, and connected in parallel with the inverter;
    a pre-charge circuit pre-charging the capacitor, connected in parallel with the contactor and configured to comprise a pre-charge resistor that supplies a pre-charge current to the capacitor; and
    a control circuit, controlling the pre-charge circuit and the contactor, wherein
    the control circuit comprises a sensor that measures a voltage of the battery and a voltage of the capacitor, and, after determining whether the voltage of the capacitor is less than a voltage value obtained by adding a predetermined voltage value to the voltage of the battery, determines whether the pre-charge is necessary according to whether a ratio of the voltage of the capacitor to the voltage of the battery is equal to or less than a target value.

7. A non-transitory computer-readable medium storing a power supply program, the power supply program being executed in a power supply device comprising:
    a capacitor, connected in series with a contactor that is connected between an inverter driving a motor and a battery and that switches on or off power supply from the battery to the inverter, and connected in parallel with the inverter;
    a pre-charge circuit pre-charging the capacitor, connected in parallel with the contactor and configured to comprise a pre-charge resistor that supplies a pre-charge current to the capacitor; and
    a control circuit, controlling the pre-charge circuit and the contactor, the power supply program being executed by the control circuit, wherein the control circuit comprises a sensor that measures a voltage of the battery and a voltage of the capacitor, and, after determining whether the voltage of the capacitor is less than a voltage value obtained by adding a predetermined voltage value to the voltage of the battery, determines whether the pre-charge is necessary according to whether a ratio of the voltage of the capacitor to the voltage of the battery is equal to or less than a target value.

* * * * *